United States Patent
Richards et al.

(10) Patent No.: US 10,838,998 B2
(45) Date of Patent: Nov. 17, 2020

(54) SYSTEM AND METHODS FOR EVALUATING MATERIAL SAMPLES

(71) Applicant: Insight Services, Inc., Strongsville, OH (US)

(72) Inventors: Daniel Richards, Bath, OH (US); Alan Brunet, Lawranceville, GA (US); Matthew T. McMahon, Cleveland, OH (US)

(73) Assignee: Insight Services, Inc., Strongsville, OH (US)

( * ) Notice: Subject to any disclaimer, the term of this patent is extended or adjusted under 35 U.S.C. 154(b) by 248 days.

(21) Appl. No.: 15/942,517

(22) Filed: Mar. 31, 2018

(65) Prior Publication Data
US 2019/0303450 A1   Oct. 3, 2019

(51) Int. Cl.
| | |
|---|---|
| *G06F 16/35* | (2019.01) |
| *G06Q 10/06* | (2012.01) |
| *G06F 16/338* | (2019.01) |
| *G06F 16/33* | (2019.01) |

(52) U.S. Cl.
CPC .......... *G06F 16/355* (2019.01); *G06F 16/338* (2019.01); *G06F 16/3331* (2019.01); *G06Q 10/0631* (2013.01)

(58) Field of Classification Search
CPC ................................................ G06G 10/0639
USPC ................................................. 707/603, 607
See application file for complete search history.

(56) References Cited

U.S. PATENT DOCUMENTS

| | | | |
|---|---|---|---|
| 6,636,585 B2 * | 10/2003 | Salzberg | H04M 3/22 379/15.01 |
| 6,823,283 B2 | 11/2004 | Steger et al. | |
| 7,542,867 B2 | 6/2009 | Steger et al. | |
| 7,949,539 B1 * | 5/2011 | Mitchell | G06Q 10/10 705/1.1 |
| 8,443,428 B2 | 5/2013 | Martin et al. | |
| 8,731,967 B2 | 5/2014 | Jacobus et al. | |
| 8,631,501 B2 | 8/2014 | Ruppert et al. | |
| 8,805,863 B2 | 8/2014 | Culbertson | |
| 9,059,963 B2 | 6/2015 | Carroll | |
| 9,286,617 B2 | 3/2016 | Maskatia et al. | |
| 9,384,455 B2 | 7/2016 | Melkote et al. | |
| 9,465,822 B2 | 10/2016 | Quine | |
| 9,563,906 B2 | 2/2017 | Stark | |
| 9,633,325 B2 | 4/2017 | Bolene et al. | |
| 2003/0212583 A1 * | 11/2003 | Perras, Jr. | G06Q 10/06 705/7.36 |
| 2011/0202499 A1 * | 8/2011 | Spiers | G06F 16/252 707/607 |
| 2011/0288907 A1 * | 11/2011 | Harvey | G06Q 10/0639 705/7.29 |

(Continued)

*Primary Examiner* — Baoquoc N To
(74) *Attorney, Agent, or Firm* — Katterle Nupp LLC; Robert Nupp; Paul Katterle

(57) ABSTRACT

Disclosed herein are systems, methods, and non-transitory computer-readable storage media for evaluating a tested sample of material. The system includes an application such as a LIMS comprising master keys derived from individual test result evaluations and potentially one or more key tags, and textual comments linked to master keys for later display and/or inclusion in customized reports. Master key branching using key tags, together with user refinement of comments linked thereto, results in improved comments with increased customization over time.

19 Claims, 8 Drawing Sheets

(56) References Cited

U.S. PATENT DOCUMENTS

| | | | | |
|---|---|---|---|---|
| 2012/0069131 A1* | 3/2012 | Abelow | ............... | G06Q 10/067 |
| | | | | 348/14.01 |
| 2012/0330900 A1* | 12/2012 | Patwardhan | .......... | G06F 16/254 |
| | | | | 707/690 |
| 2016/0019090 A1* | 1/2016 | Kuromatsu | ........... | G06F 9/5038 |
| | | | | 718/102 |
| 2017/0097971 A1* | 4/2017 | Brown | .................... | G06F 16/26 |

* cited by examiner

SYSTEM AND METHODS FOR EVALUATING MATERIAL SAMPLES

TECHNICAL FIELD

The present disclosure relates to improved evaluation of test results and generation of test result commentary in systems such as lab information management systems.

BACKGROUND

In general, individuals or businesses may have a need to evaluate a sample of material using a plurality of different tests, in an efficient and cost-effective manner. Systems such as lab information management systems (LIMS) provide a software platform that enables operations, such as laboratory operations, to efficiently manage and track resources and samples, manage work allocation and workflow, provide integration of instruments and applications, provide interfaces and resources for data input, exchange, collection and storage, provide quality assurance and audit resources, provide reporting, provide support for functions such as purchase orders, invoices, customer service, lab management metrics, inventory, etc.

Providing customized reports to users is an important requirement for many systems, including many LIMS systems. A downside to providing customized reports, however, is that it may be necessary to perform a number of inefficient, manual steps to evaluate test results and generate commentary or other customized content for the report. For example, a lab report based on lab test results may require a technician to review the results of each lab test obtained for a test sample and to interpret those results, and thereafter to generate analytical commentary for each sample based on each test result. Accordingly, in order to allow for operators of LIMS and other systems to generate reports for users that contain customized commentary, and to do so efficiently and in less time, there is a need for systems and methods that automate all or a portion of the steps needed to generate customized commentary.

BRIEF SUMMARY

Disclosed herein are embodiments of a novel computer-implemented method for evaluating a sample of material. In the one or more embodiments, at least one database is provided that stores test criteria for a plurality of different lab tests, test run information for a plurality of different test runs, information correlated to the test run information, and a plurality of textual comments correlated to derived master keys. The test run information comprises at least one test run result metric. New test run results are received for a plurality of assigned lab tests that were performed on the material sample. For each of the new test run results, the at least one test run result metric is automatically generated using the new test run result and test criteria associated with the lab test performed on the sample, and the at least one metric is associated with the new test run result. The at least one database is accessed to retrieve information correlated to the at least one test run result metric for the lab test performed on the sample. A master key is derived from the metrics generated for each of the new test run results. The at least one database is accessed to retrieve a textual comment corresponding to the derived master key.

In one or more embodiments, a novel computer-implemented method of evaluating a sample of material is disclosed. In the one or more embodiments, at least one database is provided that stores test criteria for a plurality of different lab tests, test run information for a plurality of different test runs, information correlated to the test run information, and a plurality of textual comments correlated to derived master keys. The test run information comprises at least one test run result metric. New test run results are received for a plurality of assigned lab tests that were performed on the material sample. For each of the new test run results, the at least one test run result metric is automatically generated using the new test run result and test criteria associated with the lab test performed on the sample, and the at least one metric is associated with the new test run result. The at least one database is accessed to retrieve information correlated to the at least one test run result metric for the lab test performed on the sample. A master key is derived from the metrics generated for each of the new test run results and from at least one master key tag. The at least one database is accessed to retrieve a textual comment corresponding to the derived master key.

BRIEF DESCRIPTION OF THE DRAWINGS

The present disclosure, in accordance with one or more various embodiments, is described in detail with reference to the following drawings. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The components in the drawing are not necessarily drawn to scale. In the drawings, like reference numerals designate corresponding parts throughout the several views. One of ordinary skill in the art will appreciate that a component may be designed as multiple components or that multiple components may be designed as a single component.

FIGS. 5A-5B are diagrams illustrating exemplary graphical user interfaces and/or web screens comprising certain master comment editor functionality according to various embodiments.

DETAILED DESCRIPTION

Figure 1:
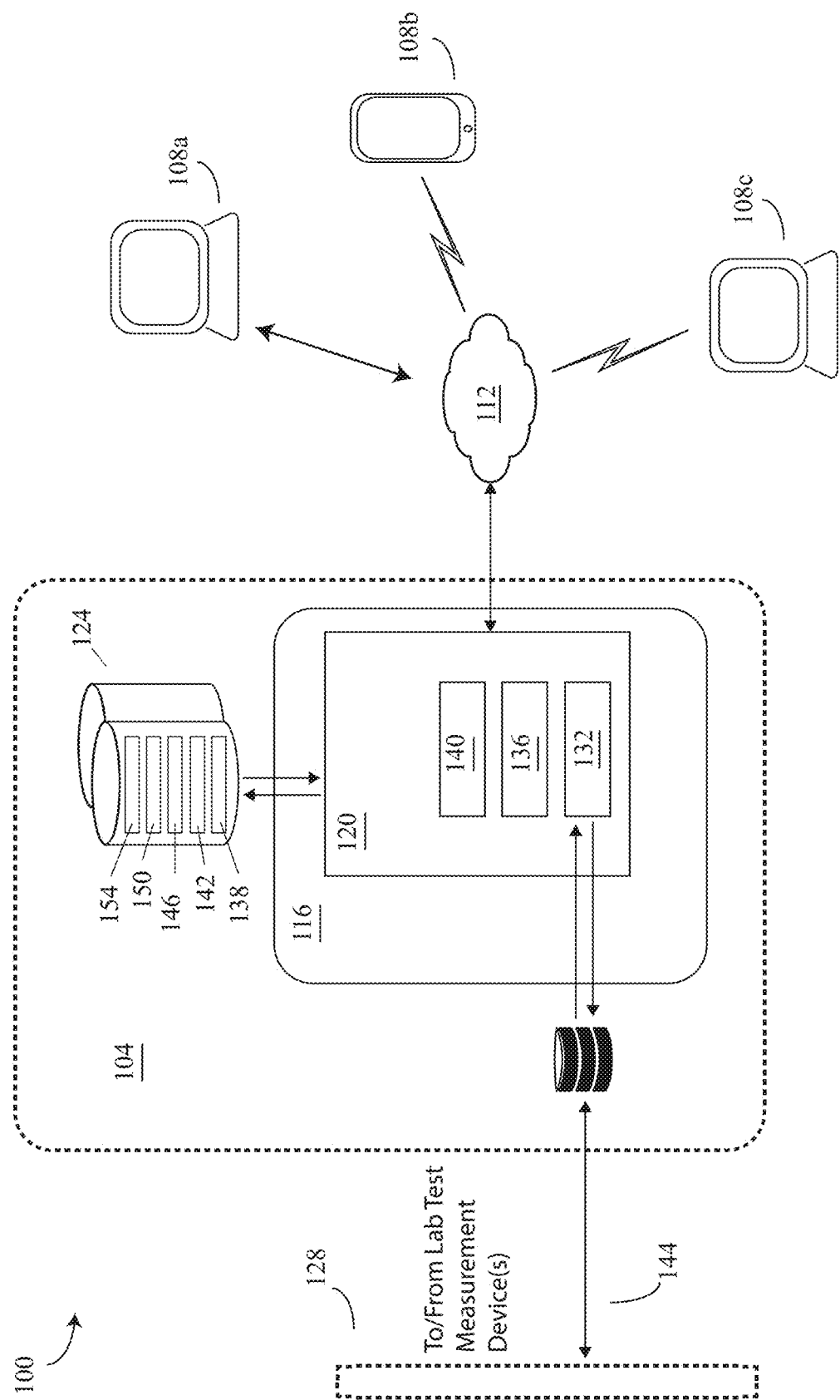
FIG. 1 is a block diagram illustrating components of an exemplary networked operating environment in which various embodiments of the present disclosure may be implemented.

The present disclosure describes and illustrates one or more novel embodiments of a system and method for evaluating a sample of material. In one or more embodiments, the system and method include an expert module for generating comments in a lab information management system (LIMS). It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary" (or similarly) herein, it is to be understood as one non-limiting example embodiment, and does not preclude other embodiments that may not include the limitations described in the exemplary embodiment.

As may be appreciated by one of skill in the art, aspects of the embodiments described herein may be employed as a system, method or computer program product. Accordingly, aspects may take the form of a hardware embodiment, a software embodiment (including firmware, etc.) or an embodiment combining hardware and software that may all generally be referred to herein as a "module," "component," or "system." Further, aspects of the disclosed embodiments may take the form of a computer program product embodied in one or more computer readable medium(s) having computer readable program code represented thereon.

As may be appreciated by one of skill in the art, aspects of the embodiments described herein as functions, algorithms or methods may be implemented in software. The software may comprise computer executable instructions stored on computer readable media. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In general, individuals or businesses may have a need to evaluate a sample of material using a plurality of different tests, in an efficient and cost-effective manner. For example, testing labs frequently have a need to efficiently evaluate material samples. In addition, testing labs frequently utilize a lab information management system (LIMS system) in order to, for example, manage, store, and report data that is generated from lab tests performed on material samples, among other functions.

Unless expressly limited, none of the embodiments described herein should be considered limited to a particular material nor to a particular lab test. Material samples may include, for example, oil, grease, varnish, filter debris, etc.

As shown in FIG. 1, an exemplary network environment implementing a system 100 for evaluating a sample of material according to various embodiments described herein includes a computing environment 104 in data communication with one or more clients, three of which are illustrated by devices 108a,b,c, via network 112. Devices 108 may comprise a client browser application—e.g. Firefox®, Internet Explorer®, Chrome®, Safari® (not shown)—for accessing dynamic or static web pages and web page content, etc. Network 112 may be the Internet, intranets, extranets, local area networks (LANs), wide area networks (WANs), wired networks, wireless network (using wireless protocols and technologies such as, e.g., Wifi), or any other network suitable for providing data communications between two machines, environments, devices, networks, etc.

Computing environment 104 may comprise one or more dedicated host computers (local or remote) and software providing the various servers, databases, data stores, and the like, suitable to provide the services described herein. Alternatively, computing environment 104 may comprise a service provider environment such as cloud infrastructure, platform, and/or software providing the various resources (e.g., server, database, data store, and the like) suitable to provide the services described herein.

With continuing reference to FIG. 1, in one or more exemplary embodiments the following elements may be deployed on computing environment 104 (or distributed among a plurality of computing environments). Server 116 may comprise one or more servers (physical and/or virtual) sufficient to provide the functionality of the embodiments disclosed herein. For example, in one embodiment, server 116 may comprise IIS software in a .NET runtime implementing one or more web server and application server components, and any necessary backend or cross-cutting components to support such services as, e.g., security, authentication, messaging, data access, etc. In another embodiment, server 116 may comprise at least one application server and at least one web server.

Referring still to FIG. 1, server 116 hosts base application 120. In an exemplary embodiment, base application 120 is a LIMS application. Base application 120 may comprise a standard three-tier architecture, although any suitable application architecture is within the scope of these embodiments. In an exemplary embodiment, base application 120 is an ASP and/or ASP.NET web application that serves dynamic and/or static web pages and content to clients 108, querying one or more databases 124 or other backend systems as necessary to serve the web pages and content. The database(s) 124 may be any database(s) sufficient to support the functionality of system 100, such as for example a relational database and/or a document-oriented database. In one or more exemplary embodiments, the database(s) 124 may include one or more SQL® databases to store test run result data, application content and data, and other data and information sufficient to support the operation of system 100 (although memory and other forms of storage, file systems, repositories, etc. may also be deployed to support operations as needed). Non-limiting examples of other data and information stored in database 124, in one or more exemplary embodiments, include: system 100 configuration information and/or parameters, such as test criteria (e.g., alarm limits), sample information, master comments, and information correlated to the test criteria, such as for example, test result ratings, test result issue status indicators, test result sub-comments, and/or sample status indicators. Hereinafter, the database(s) 124 shall be referred to singularly and collectively as database 124. Database 124 is stored in the computing environment 104.

System 100 may provide one or more graphical user interfaces (not shown) to one or more users on client devices 108. In general, a graphical user interface in system 100 comprises one or more screens or web pages provided by server 116 to one or more client devices 108, displaying content having and one or more input control elements, navigational elements, and/or informational elements to facilitate user interaction with system 100. A non-exclusive listing of exemplary input control elements includes: buttons, dropdown lists, check boxes, toggles, text fields, date fields, etc. A non-exclusive list of exemplary informational elements includes: icons, progress bars, notifications, message boxes or windows, etc. The terms "screen", "user interface", "window", and "graphical user interface" are used interchangeably herein, unless context indicates otherwise.

Lab tests refer to tests performed on a sample of material using pre-defined test protocols and/or test conditions. Results of lab test runs may be measured and recorded in any manner suitable for use in the systems and methods described herein. In one or more embodiments, lab technicians manually perform lab test runs using manual instruments of measure (e.g., rulers, thermocouples, stopwatches and demarcated flasks and tubes) and record the results in one or more local applications or user interfaces (not shown).

More preferably, in one or more embodiments of the present disclosure, lab test runs are performed and results recorded in an automated or semi-automated manner. In general, one or more measurement devices 128 measure one or more characteristics of the sample under test, using controlled conditions, and results are reported to base application 120. In general, results may be reported in any suitable manner, and in one or more exemplary embodiments are reported in the following manner. A technician prepares the material sample and test conditions, and initiates the desired test; thereafter, one or more local applications (not shown) collect and/or package the test run data into one or more test run files stored locally (e.g., on a local machine supporting the relevant measurement device 128), and one or more local applications periodically scan the local storage for new test run files and loads any such new files to central data store 130. In general, central data store 130 may comprise any suitable repository for storing files and/or other structured data, such as for example a database or file system storage. In one or more embodiments, central data store 130 comprises hierarchical file system storage mounted on computing environment 104. In one or more embodiments, test run files are communicated over communication link 144. In one exemplary embodiment, link 144 is a LAN. In another exemplary embodiment, link 144 is the Internet. Thereafter, in these one or more exemplary embodiments, one or more applications executing on computing environment 104 (represented in these embodiments by application 132) scans central data store 130 and parses the test run data in any newly discovered files and inserts/uploads the parsed data into one or more tables or containers, as the case may be, of database 124. Note that while FIG. 1 shows application 132 to be a component of base application 120, in one or more embodiments application 132 may comprise an application that is not integrated, or is more loosely coupled, with base application 120 (e.g., may comprise a standalone application). In one or more alternative embodiments, software driver(s) on local machines (not shown) that support the one or more measurement devices 128 allow for the one or more measurement devices to write data over link 144 to related application 132 and/or to database 124 using the functionality of related application 132.

In one or more exemplary embodiments, a measurement device may generally comprise an instrument, sensor, data acquisition (DAQ) device, and/or other device capable of acquiring and/or storing test run data. Non-limiting examples of measurement devices may include viscometers, thermocouples, image acquisition boards or cameras, spectrometers, smart sensors, transducers, etc. In one or more exemplary embodiments, a measurement device may also comprise a processor (e.g., CPU, microcontroller, or other devices capable of executing software instructions) and memory and/or a programmable hardware element for processing and/or storing test run data. The embodiments disclosed herein may include measurement devices implementing generally any suitable communication physical and protocol layers (including network layers or bus), and are not intended to be limited thereby. Non-limiting examples include Ethernet/Modbus, serial/Modbus, WiFi, USB, and custom protocols, among others.

Non-limiting examples of lab tests may include standardized or non-standardized tests, including but not limited to: IWI-370 ("acid crack" test); ASTM D974 ("acid number" test); IWI-180 (analytical ferrography); IWI-350 (bacteria test); ASTM D4739 (base number test); ASTM D5384 (chlorine test); ASTM D1500 (color); ASTM D130 (copper corrosion test); IWI-130 (crackle test); ASTM D1401 (demulsibility); Density; ASTM D877 (dielectric strength); ASTM 2265 (dropping point); IWI-270 (EDXRF elements); IWI-230 (extraction); IWI-271 (filter debris analysis); IWI 160 (ferrious wear concentration); ASTM D92 (flash point); ASTM D93 (flash point); ASTM D892 (foam); IWI-240 (freezing point); FTIR; ASTM D7593 (fuel dilution by GC); IWI-340 (glycol); ASTM D4898 (gravimetric analysis); ASTM D5185 (elemental spectroscopy); ASTM D 6304 Procedure A and C (Karl Fischer water); ASTM D7843 (membrane patch colorimetry); IWI-320 (nitrites); particle count; IWI-142 (pH); ASTM D97 (pour point); IWI-143 (reserve alkalinity); ASTM D2272 (rotating pressure vessel oxidation); ASTM D6971 ("ruler" test); ASTM D665 (rust); ASTM D1298 (specific gravity); IWI-200 (sugar); IWI-360 (tramp oil); IWI-251 (ultra centrifuge); ASTM D445 (viscosity); ASTM 2270 (viscosity index); ASTM D2161 (viscosity sus); IWI 350 (yeast and mold), etc.

As shown in FIG. 1, system 100 includes one or more configuration table(s) 138 stored in database 124. In general, configuration table 138 may store any pre-configured data and information suitable to support desired system functionality. For example, configuration table 138 may store default information relating to customers, material samples and/or lab tests. Such default information may be classified or structured by, e.g., material type, sample source (e.g., customer, location/plant, machine), sample type (e.g., XYZ Brand oil), etc. In one or more embodiments, configuration table 138 stores information comprising default sets of lab tests to be performed on samples from particular sources and/or of particular types. In one or more embodiments, configuration table 138 stores information comprising lab test criteria such as lab test alarm limit default values and/or test run results default rating scales to be associated with tests performed on samples from particular sources and/or of particular types. In one or more embodiments, configuration table 138 stores customer, plants (locations), and/or equipment directories.

Also as shown in FIG. 1, system 100 includes one or more sample table(s) 142 stored in database 124. In general, sample table 142 may store any data and information relating to a material sample suitable to support desired system functionality. For example, in one exemplary embodiment, sample table 142 stores source information (e.g., customer, location/plant, machine), sample collection dates, and sample status information. In general, sample status information may be any information indicative of a sample's current status. For example, in one or more embodiments, sample status includes at least one status indicator that indicates at least one of the test runs associated with the sample is in an error state.

With further reference to FIG. 1, system 100 includes one or more test run table(s) 146 stored in database 124. In general, test run tables 146 may store any data and information relating to test runs suitable to support desired system functionality. For example, in one or more exemplary embodiments, test run table 146 stores test run results information. In some embodiments, test run table 146 also stores at least one test run results metric for each test run performed on any material sample (even if it is simply a default value for certain samples and/or tests). In one or more exemplary embodiments, test run results metrics comprise test run results ratings and test run results alarm condition information. In one or more embodiments, system 100 stores test run data and information in multiple test run tables 146, wherein each table corresponds to a particular lab test (e.g., a demulsibility test run table, a viscosity test run table, etc.).

In general, test run result ratings may be any information indicative of quality or ranking of a test run result. For example, in some embodiments test run rating information comprises a numerical rating on a correlated scale (e.g., a whole number from 0-9). Generally, test run alarm condition information comprises any information sufficient to indicate an alarm limit or condition has been exceeded or otherwise satisfied. For example, in some embodiments test run alarm condition information comprises a numerical rating or alphanumeric value (e.g., a whole number or letter representing an error code).

Figure 2:
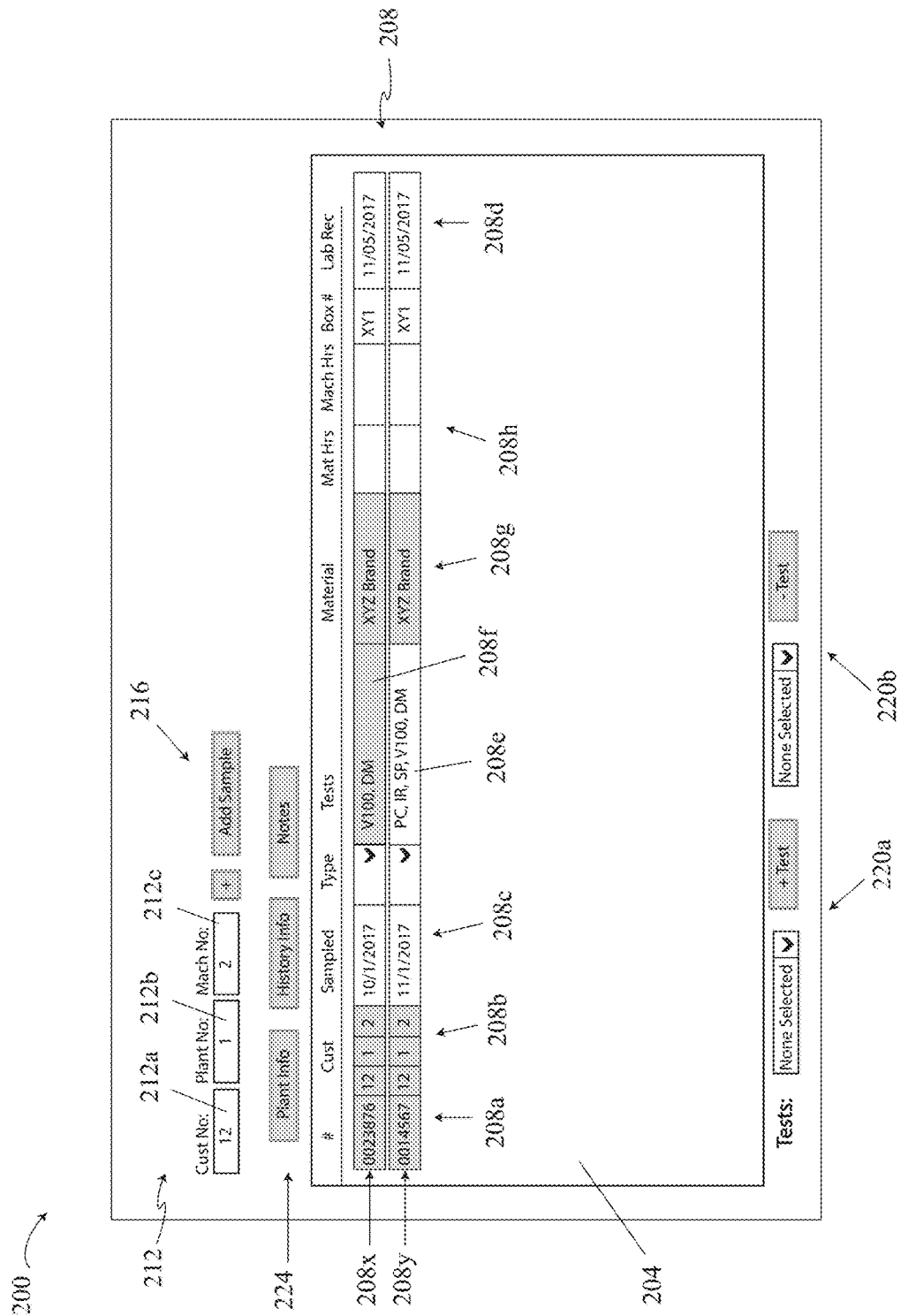
FIG. 2 is is a diagram illustrating an exemplary graphical user interface comprising an accessioning screen and having accessioning functionality according to various embodiments.

In one or more embodiments disclosed herein, information relating to new material samples is entered into system 100 using one or more accessioning user interfaces. With reference to FIG. 2, one exemplary accessioning screen 200 is shown. Interface 200 includes pane 204 that contains one or more rows 208x, y. In general, each row 208 is associated with a particular material sample and comprises a plurality of interface elements (e.g., input control and/or informational fields such as elements 208a-g) receiving and/or displaying information associated with the sample it is associated with. In one or more embodiments, at least one informational element in rows 208 is populated with data residing in one or more tables in database 124, such as for example configuration table 138 and/or a sample table 142. In one or more embodiments, at least one input control element of screen 200 (e.g., dropdown menu and button 220a, b, described in more detail below) is configured to insert a new record and/or update one or more existing corresponding records in one or more tables in database 124, such as for example configuration table 138 and/or sample table 142, when a user specifies data to be entered using the element.

Using an accessioning screen, such as screen 200, users may enter a new material sample into system 100. A user may specify the source of the material sample by entering source information into one or more input fields. In general, source information may comprise any suitable information that supports the functionality of the system. For example, and with reference to screen 200, input fields 212 are configured to receive information identifying the customer associated with the material sample (212a). In addition, input fields 212 are configured to receive information identifying a particular plant (212b) and machine (212c) from which the material sample was taken, if applicable. Having specified source information in the appropriate fields (e.g., with respect to FIG. 2, having specified customer number "12", plant number "1", and machine number "2"), a user may enter the information in system 100 by, e.g., pressing button 216. System 100 is configured such that button 216 activates one or more processes that result in the creation and insertion of one or more records in database 124 sufficient to support system 100 operation in relation to the new material sample.

Upon a new material sample being added to system 100, it receives a unique identifier. In general, the unique identifier may be any suitable identifier capable of uniquely identifying samples in system 100. In one or more embodiments, the unique identifier is a numeric string or whole number. In the embodiment shown in FIG. 2, the unique identifier is a numeric string (known as the "lab number") selected and assigned to samples by system 100 in a consecutive manner. In one or more embodiments, the lab number serves as a primary key for one or more tables (e.g., sample table 142) in database 124.

With reference to FIG. 2, rows 208 are displayed in pane 204 and correspond to added samples. As shown, for example, the samples corresponding to rows 208x and 208y are identified by lab numbers "0023876" and "0014567", respectively, which are displayed in fields 208a. The fields 208b display source identification information (in this embodiment, customer/plant/machine). Fields 208c and 208d display the dates, or otherwise receives dates input by a user, corresponding to the dates the material sample was collected at the source and received by the testing lab, respectively. In general, unless context indicates otherwise, the fields of screen 200 (such as fields 208c, d) display information stored in associated record(s) in supporting table(s) of database 124, or otherwise are configured to receive user input and update any such associated record(s).

With continuing reference to FIG. 2, fields 208e and 208f display the sets of lab tests associated with samples having lab numbers 0014567 and 0023876, respectively. As shown, sample 0023876 (see row 208x) has associated with it the "V100" (viscosity, 100 C) and "DEM" (demulsibility) lab tests, while sample 0014567 (see row 208y) has associated with it the "PC" (particle count), "IR" (infrared spectrometry), "SP" (elemental spectroscopy), "V100" and "DEM" lab tests. In the embodiment shown, the gray shaded area of field 208f indicates that the set of lab tests listed there are pre-configured in system 100 to be associated with new material samples having one or more pre-configured parameters, such as, for example, a particular source (e.g., in the case of sample 0023876, having a customer/plant/machine source of "12", "1", and "2", respectively). In one or more embodiments, however, such pre-configured (or "default") sets of lab tests may be modified by, for example, adding to or subtracting from the list. Referring to FIG. 2, the white/blank background area of field 208e indicates that the listing is not a default set of lab tests and/or is a modified set. Furthermore, comparing field 208e to field 208f shows that a user has added to the default set of lab tests by adding the PC, IR, and SP lab tests. In the accession screen embodiment shown in FIG. 2, a user may modify a test set associated with a particular material sample by highlighting the row and/or field of interest (e.g., field 208e) and using the dropdown lists and associates buttons 220a, b to accomplish adding to or subtracting from a test set.

With continuing reference to FIG. 2, field 208g displays a pre-configured/default indication of material sample type and/or brand (for example "XYZ Brand" of lubricating oil) and/or receives a user's input of such information. Field 208h is configured to receive user input, if any, regarding the amount of wear the material sample has received (e.g., number of machine-hours the sample received). Using buttons 224, a user may call up additional windows or interface elements with which to associate additional, contextual information regarding material samples.

In one or more embodiments disclosed herein, after a new test run is performed on a sample and the new test run result is uploaded to the appropriate test run table 146, one or more evaluations of the uploaded result are automatically performed to generate one or more test run result metrics. For example, in one or more embodiments, the evaluations include one or more rating evaluations and/or one or more alarm condition evaluations. A rating evaluation may generally be any analysis that rates and/or ranks the test run result in question according to a pre-determined scale or methodology, while an alarm condition evaluation may generally be any analysis comparing the run result in question to one or more pre-configured alarm limits. In a non-limiting example, the rating evaluation comprises comparing the test run result to one or more predetermined values and assigning a whole number rating between 0-9 to the result depending on how the test run result compares to the predetermined values. In another non-limiting example, the alarm condition evaluation compares the test run result to one or more pre-configured alarm limits (set by source and/or type standard) and assigns a whole number or alphanumeric value (e.g, a whole number between 0-9) depending on whether the test run result exceeds the one or more alarm limits (on either the high or low end) or not. For example, in some embodiments, system 100 assigns a low value whole number (e.g., 1) if the test run result falls below a pre-configured low alarm limit, a high whole number value (e.g., 3) if the test run result exceeds a pre-configured high alarm limit, and otherwise assigns another whole number value (e.g., 2). Other embodiments include additional alarm conditions (e.g., one or more high or low warning limits). In some embodiments, system 100 performs only an alarm condition evaluations (in which they may be considered to serve as a rating), while in others it performs both a rating evaluation and alarm condition evaluation. Note that the embodiments disclosed herein should not be understood to be limited by any specific rating or alarm condition evaluation scale or methodology, and generally any suitable scale or methodology may be employed that supports the objects of the embodiments herein.

In some embodiments of system 100, the automatic rating and/or alarm condition evaluation is automatically performed after a new test run result is uploaded to the relevant test run table 146 by triggering one or more stored procedures that execute in computing environment 104 (e.g., on server 116). Note that, although database triggers and stored procedures are expressly referenced, the disclosure herein is not intended to be limited to this particular mechanism for automatic evaluation, and in general any suitable mechanism may be used that comports with the objectives of the embodiments disclosed. Upon performing the one or more rating and/or alarm condition evaluations, system 100 associates the value returned by the evaluation with the relevant test run record. In some embodiments, this is accomplished by updating the test run record in table 146 with the rating (e.g., whole number) and/or alarm condition information (e.g. whole number or error code), although generally any suitable manner of associating the evaluation results may be employed.

In some embodiments of system 100, test run result data is automatically evaluated to determine a rating and/or alarm condition status for only a subset of test run types, while in others it is automatically evaluated for every test run type. In one or more exemplary embodiments, system 100 also supports manual rating and/or alarm condition evaluations.

Figure 3:
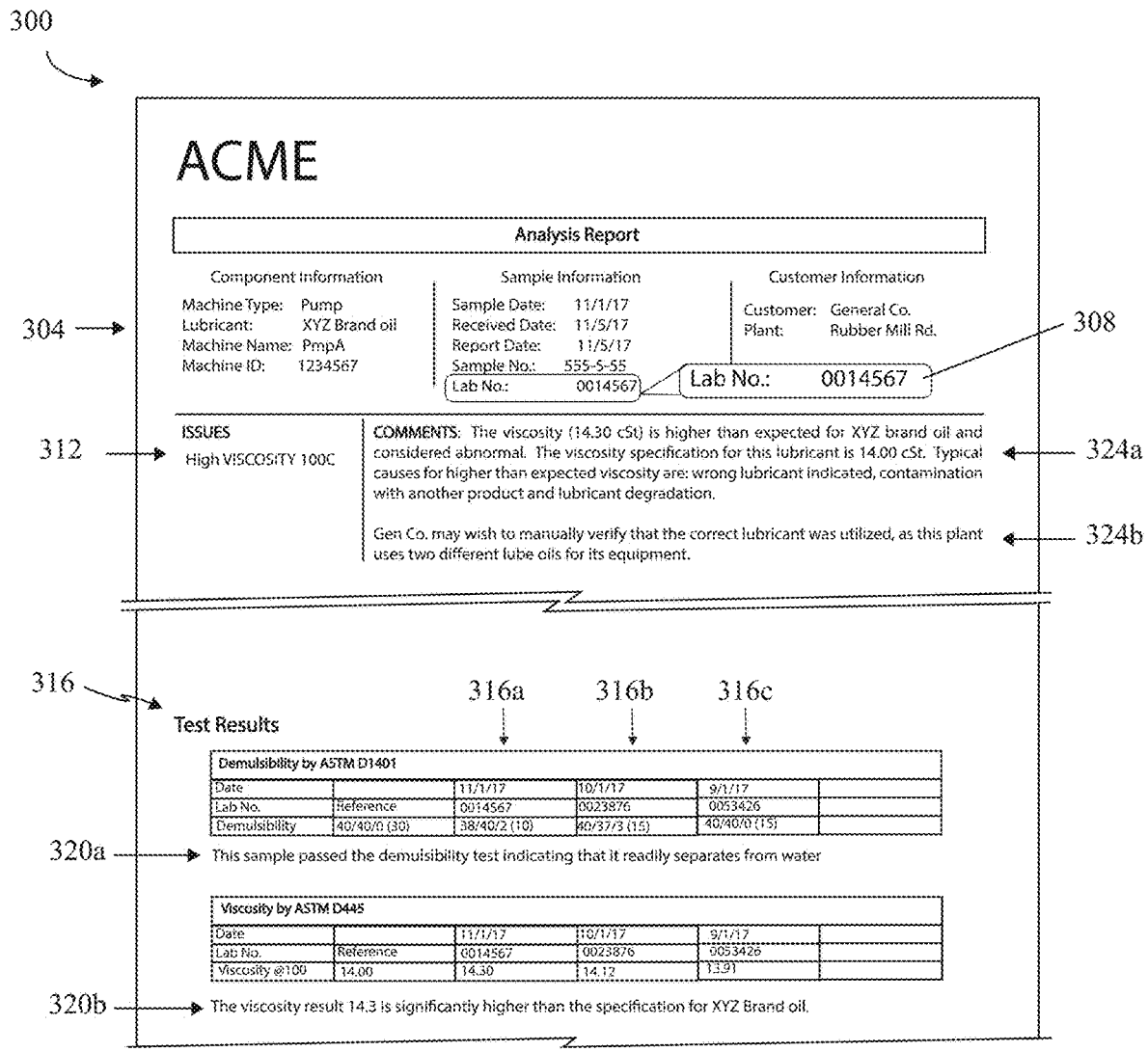
FIG. 3 is a diagram illustrating an exemplary report generated using various embodiments of the present disclosure.

In one or more exemplary embodiments of the present disclosure, system 100 is configured to generate one or more types of sample test reports. A non-limiting example of a exemplary test report 300 is shown in FIG. 3, and comprises a sample identification portion 304, one or more issue alerts 312, test run result details portion 316, one or more sub-comments 320a, b, and one or more master comments 324a, b. Note that test report 300 is exemplary, and system 100 may provide other and/or additional reports containing additional and/or different elements and content from that shown in FIG. 3.

In general, sample identification portion 304 may comprise any sample identifying information suitable to support the functionality of system 100. In one or more embodiments disclosed herein, sample identification portion 304 comprises source identification information (e.g., customer/plant/machine) and lab number 308. In some embodiments, sample identification portion information is retrieved from one or more tables in database 124, such as configuration table 138 and sample table 142. In one or more embodiments, issue alerts 312 comprise, for example, a text indicator or flag summarizing a negative result that is associated with a test run result in system 100. In one or more embodiments, test run result details portion 316 shows results of individual test runs for the current sample (see column 316a), and in some embodiments also shows historical test run results, as illustrated by columns 316b, c. In general, historical test run result data refers to one or more stored test run results from prior test run(s) of the same type (e.g., the same type of test) performed on one or more samples of the same type and from the same source that were collected at and tested at different times. In other words, historical test run results data refers to test run results data from different samples of the same type from the same source.

With continuing reference to FIG. 3, test report 300 includes mini-expert comments 320a, b (also referred to herein as a "mini-comments" or "sub-comments") and master comments 324a, b. In general, sub-comments are configured in system 100 and, in one or more exemplary embodiments, are automatically retrieved from one or more sub-comment tables 150 (FIG. 1) by mini-expert component 136 (FIG. 1) based on, in some embodiments, one or more test run result metrics, as described in more detail below. In general, master comments are configured in system 100 and, in one or more exemplary embodiments, are automatically retrieved from one or more master comment tables 154 (FIG. 1) by master expert component 140 (FIG. 1) based on, for example, a primary key ("master key") derived from the test run result metrics, as described in more detail below.

Sub-comments are generally any information in the nature of commentary, observations, summary, analysis, etc. that is directed to individual test run results. For example, with reference to FIG. 3, sub-comment 320b is directed to the viscosity test run result of "14.3" for the sample having lab number "0014567," and comprises an observation that the result is "significantly higher" than the stored specification for the tested material. In one or more embodiments, sub-comments are stored in database 124 (and in some embodiments in sub-comment table 150 in particular). In general, in the embodiments disclosed herein, sub-comments may be associated with individual lab test run results in any suitable manner that does not undermine the functionality of the embodiments herein. For example, in some embodiments each sub-comment is associated with a generated rating and/or alarm condition status for each test run result. With reference to the example shown in FIG. 3, in some embodiments, sub-comment 320b is retrieved from database 124 in relation to sample "0014567" using a correlated metric (e.g., a rating and/or alarm condition status) indicative of a high test run result value ("14.30") as compared with a reference value ("14.00") pre-configured for that sample type and/or sample source.

Figure 4A:
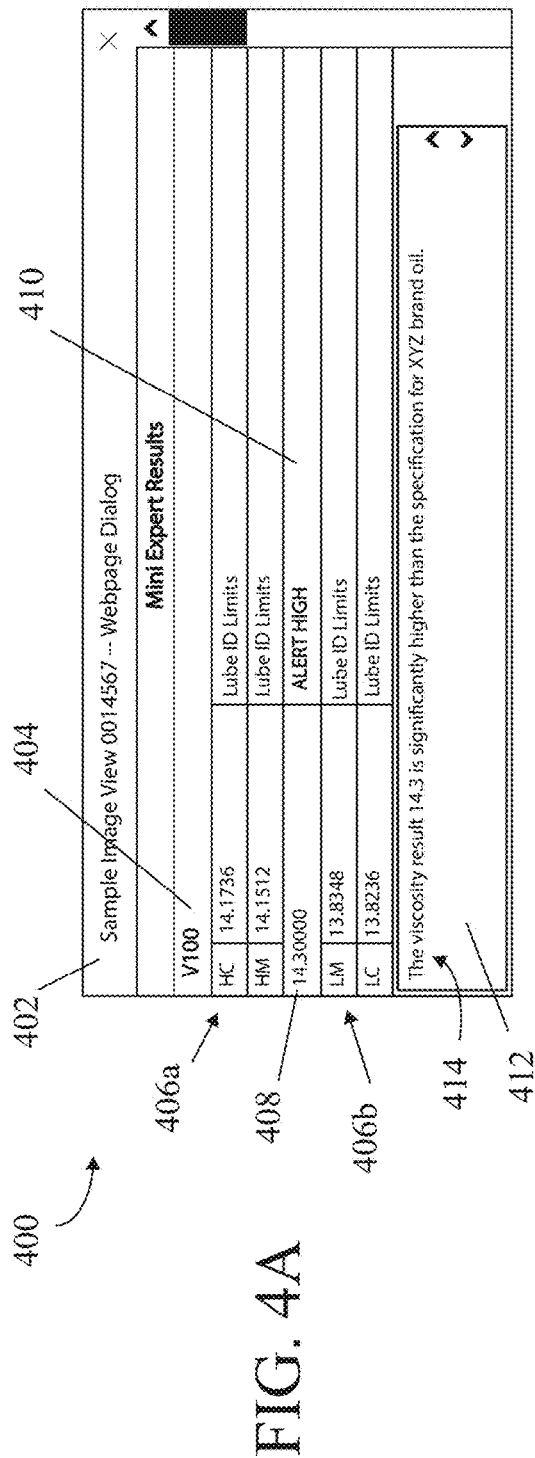
FIG. 4A is a diagram illustrating an exemplary graphical user interface and/or web screen comprising certain mini-expert element functionality according to various embodiments.

In general, sub-comments associated with each test run result may be managed (generated, stored, deleted, updated, retrieved, maintained, etc.) in any manner that supports the functionality of the systems disclosed herein. In one or more exemplary embodiments, one or more mini-expert components, illustrated by component 136 (FIG. 1), provides functionality in relation to sub-comments sufficient to support system 100. For example, in one or more embodiments, the mini-expert component (potentially in some embodiments in conjunction with one or more other components) adds, deletes, updates, and retrieves sub-comment information stored in one or more sub-comment tables 150 (FIG. 1). Note that while FIG. 1 shows sub-comment component 136 to be a component of base application 120, in one or more embodiments sub-comment component 136 may comprise an application or module that is not integrated, or is more loosely coupled, with base application 120 (e.g., may comprise a standalone or separate component or application). Also note that, as used herein, the term "mini-expert" refers to component 136, as well as any corresponding user interfaces, such as window 400 (FIG. 4A), and any code or functionality utilized to generate the one or more test run results metrics, unless context indicates otherwise.

In general, a user may interact with system 100 to manage sub-comments in any suitable manner that does not undermine the functionality of the system. For example, in one or more embodiments, a user may interact with one or more windows or screens, such as sub-comment window 400 shown in FIG. 4A, to review and update sub-comments. Screen 400 comprises one or more interface elements to present information and/or receive user input regarding individual lab test results for a given material sample. For example, element 402 is a header indicating the relevant material sample—in this example, the sample having lab number "0014567". Element 404 indicates the name or other identification of the individual lab test in question. In this example, the lab test identification reads "V100", in reference to a viscosity measurement lab test, although system 100 may be configured to use any suitable identifiers for individual lab tests. Element 406a, b indicates any relevant pre-configured test criteria such as high and low test result alarm limits (marginal and/or critical), respectively, for this particular type of test, sample type and/or sample source. Element 408 indicates the test run result for the lab test in question performed on the material sample of interest (e.g., "14.300000"). Element 410 indicates any applicable issue alert information retrieved for the test run result shown in element 408. As referenced above, issue alerts comprise text or other flag summarizing a negative result associated with a test run result stored in system 100. In one or more embodiments, the mini-expert associates one or more issue alerts with an individual test run result using one or more result metrics (e.g., a rating and/or alarm condition status).

Figure 4B:
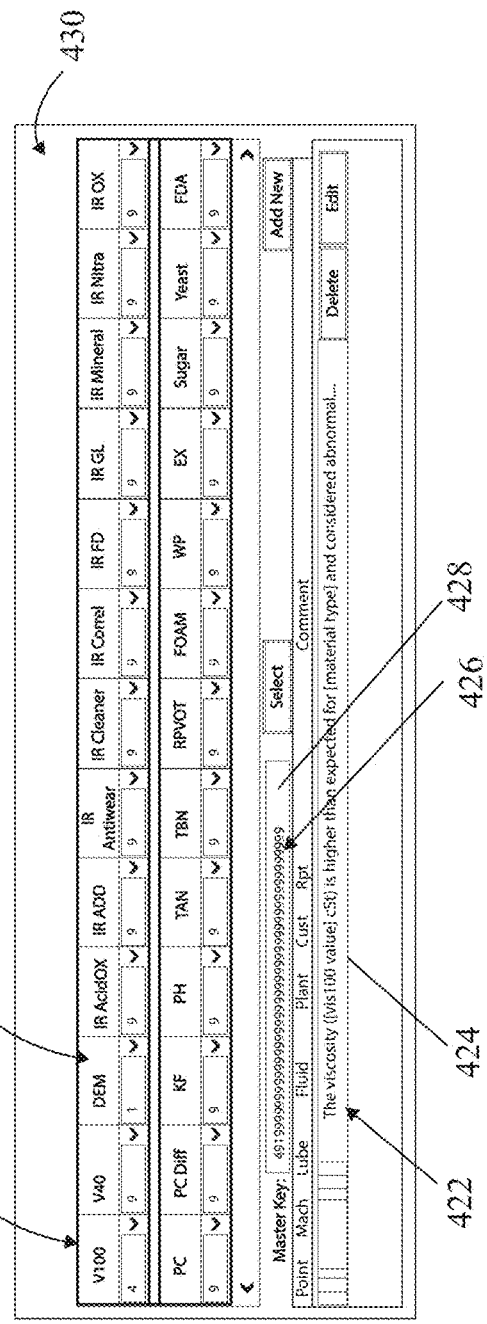
FIG. 4B is a diagram illustrating an exemplary graphical user interface and/or web screen comprising certain master comment expert functionality according to various embodiments.

With continued reference to FIG. 4B, element 412 is a text element displaying relevant sub-comment(s), and in this particular example displays sub-comment 414. In general, in the embodiments disclosed herein, sub-comments may be associated with individual lab test run results in any suitable manner that does not undermine the functionality of the embodiments herein. For example, in some embodiments, a mini-expert performs one or more sub-comment evaluations to determine the sub-comment(s) to apply to a particular lab test run result, if any. In these embodiments, the sub-comment evaluation(s) may consider generally any suitable sub-comment criteria, such as for example: alarm limits, test run result metrics (e.g., alarm condition status, ratings), and/or pre-configured specification values with standard deviation values, etc. Suitable sub-comment criteria may be pre-configured and selected in any suitable manner that does not undermine the functionality of the embodiments disclosed herein. For example, in one or more embodiments the sub-comment criteria is applied based on sample type (e.g., oil, XYZ Brand oil, grease, filter particulates, etc), test type, and/or sample source (e.g., customer/plant/machine). In one or more embodiments, the sub-comment evaluations are part of/performed with the automatic test run result metric evaluations previously described (e.g., rating and/or alarm condition status evaluations).

Using window 400, a user (e.g., a lab technician) may review the relevant sub-comment and, in some embodiments, modify the sub-comment. In other embodiments, one or more additional and/or different interfaces provide a user the ability to review and/or modify sub-comments associated with a lab test run result.

Master comments are generally any information in the nature of commentary (including textual commentary), observations, summary, analysis, etc. that are directed to a set of test run results from a battery of tests performed on a material sample and/or to overall analysis or commentary on the material sample under test. Accordingly, whereas sub-comments are generally directed to individual test run results, master comments are generally more global in nature, with respect to the material sample in question. In one or more embodiments, master comments are textual comments drafted or selected to provide helpful information to a user regarding analysis and/or summary of results of the battery of lab tests performed on the material sample. In one or more preferred embodiments, the textual comment indicates a problem with the sample and identifies a possible cause of the problem.

The sample report set forth in FIG. 2 provides an exemplary illustration of master comments. In that example, master comments 224a, b address a test run result that is out of desired range (i.e., the viscosity test result) and provide additional information and analysis than that provided in the relevant sub-comment for that test. In this example, the additional information is a suggestion of possible causes for the material being out of specification, and a suggested course of corrective action (i.e., to verify that the correct material was used in the equipment). Non-limiting examples of other types of master comments include: a summary that all the tests results are within specified limits and the sample appears in compliance, a summary of multiple test results that are out of specified limits and recommending a course of action and/or offering potential causes for the multiple test results that are out of compliance, etc.

In general, master comments may be managed (generated, stored, deleted, updated, retrieved, maintained, etc.) in any manner that supports the functionality of the systems disclosed herein. In one or more exemplary embodiments, one or more master expert components, illustrated by component 140 (FIG. 1), provides functionality in relation to master comments sufficient to support system 100. For example, in one or more embodiments, the master expert component (potentially in some embodiments in conjunction with one or more other components) adds, deletes, updates, and retrieves master comment information stored in one or more master comment tables 154 (FIG. 1). Note that while FIG. 1 shows master expert component 140 to be a component of base application 120, in one or more embodiments master expert component 140 may comprise an application or module that is not integrated, or is more loosely coupled, with base application 120 (e.g., may comprise a standalone or separate component or application). Also note that, as used herein, the term "master expert" refers to component 140, as well as any corresponding user interfaces, such as windows 420 (FIG. 4B) and 500 (FIG. 5), and any code or functionality utilized to derive the master keys, unless context indicates otherwise.

In one or more embodiments, master comments are stored in database 124 in one or more master comment tables or containers 154 and are keyed to a master key derived from test run metrics. In general, a master key may comprise any suitable database primary key or other unique record identifier. In one or more embodiments of the present disclosure, master keys are derived from test run result ratings. In some embodiments, master expert 140 (FIG. 1) derives master keys from test run result ratings. In one preferred embodiment, the test run result ratings are whole numbers, and master keys are derived by concatenating the test run result ratings to form a numeric text string, as illustrated and more fully described in relation to FIGS. 4B & 5 below.

In general, a user may interact with system 100 to manage master comments in any suitable manner that does not undermine the functionality of the system. For example, in one or more embodiments, a user may interact with one or more windows or screens, such as master comment window 420 shown in FIG. 4B, to create new master comments and/or review and update existing master comments. Screen 420 comprises one or more interface elements to present information and/or receive user input regarding individual master keys and master comments. For example, screen 420 includes an exemplary master comment 422 displayed in text element 424 that, as shown, incudes a plurality of fields to allow for the inclusion of variable information (e.g., test results, configurable information). Screen 420 also includes the corresponding exemplary master key 426, that master comment 422 is keyed to, displayed in interface element 428. As shown, exemplary master key 426 comprises the numeric string "491999999 . . . ," which represents a concatenation of a plurality of whole number test result rankings ranging from 0-9. Those rankings are selected using element 430, which comprises a set of dropdown lists (or other user selection elements) that are each identified with a different lab test. To illustrate—element 430*a* is labelled and identified with viscosity test "V100". The dropdown lists are each populated with a range of possible test result ratings for a user to select, and in the example shown in FIG. 4B are populated by numeric ratings ranging from 0-9. Using interface elements 430, a user may make differing rating selections for one or more of the tests in set 430 and thereby specify a master key (e.g., master key 426) to display in element 428 and its corresponding master comment in element 424. Alternatively, a user may type a desired master key (e.g., master key 426) into element 428. Using window 420, a user may add new master comments that are correlated to particular master keys, delete existing master comments, and/or edit existing master comments.

With continued reference to the embodiment illustrated in FIG. 4B, a rating of "4" has been selected for the lab test "V100" (viscosity @100 C) in dropdown element 430*a* and a rating of "1" for the lab test "DEM" (demulsibility) in dropdown element 430*b*, while the remaining dropdown elements (identified with the different tests remaining in the set of relevant lab tests), have each been populated by default with a rating of "9", indicating (for example, in this exemplary embodiment) that no rating was provided for the particular test (because, for example, the test was not run for a particular sample). Having specified the master key using dropdown elements 430 (i.e., master key 426), corresponding master comment 422 may be created, deleted, updated, etc. using element 424. For example, by selecting an "add" or "edit" button in screen 420, a user may access a master comment editor window/tool 500 that permits authoring new comments or editing existing comments, as described below in relation to FIG. 5.

Figures 5A, 5B:
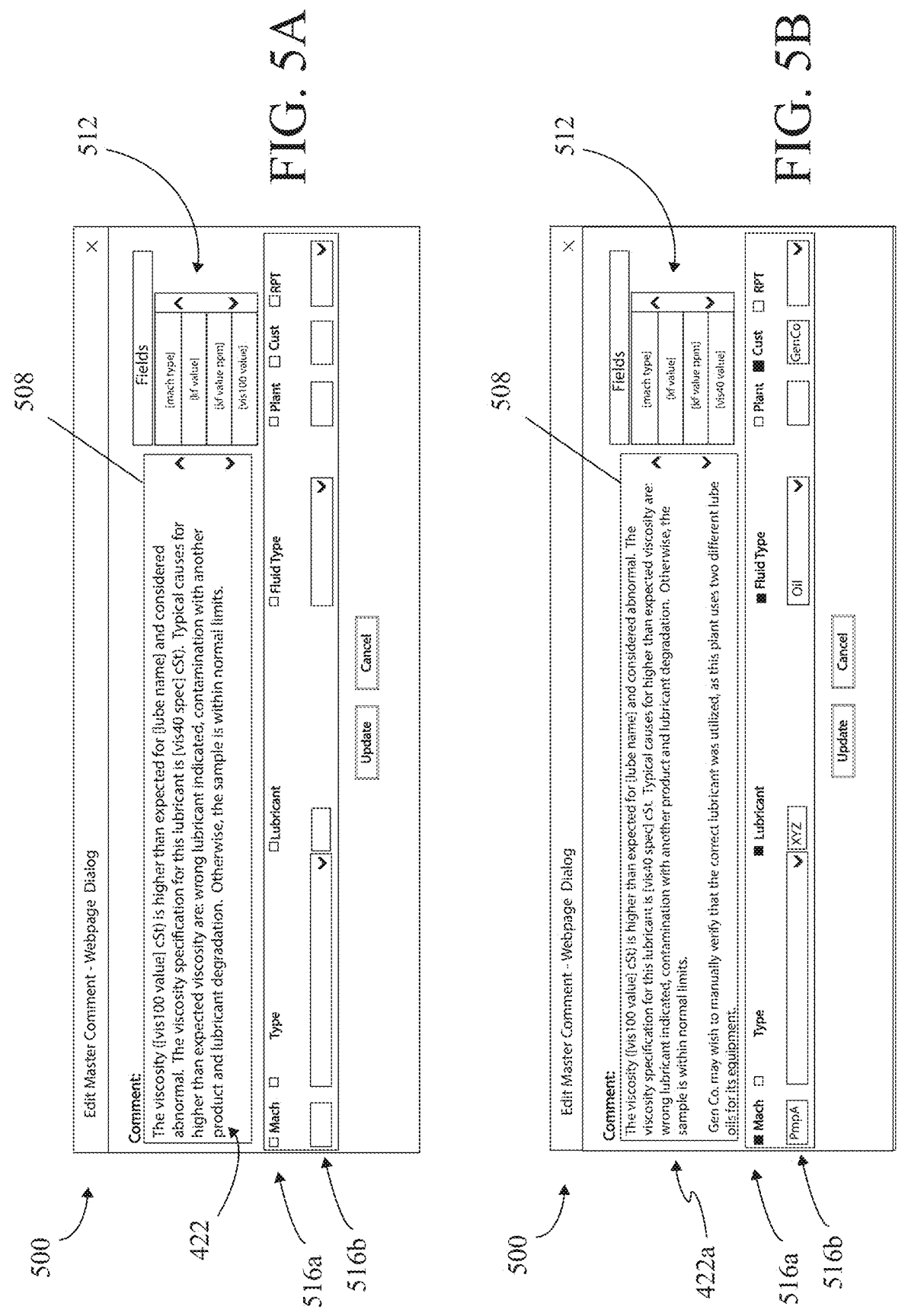

Referring now to FIGS. 5A & 5B, master comment editor window 500 of an exemplary graphical user interface provided by system 100 is shown. As illustrated, window 500 comprises text element 508 that displays the relevant master comment (the comment keyed by the relevant master key—in this example master key 426) and allows a user to create and/or modify the comment. In one or more embodiments, window 500 is configured to display a plurality of variable text fields 512 and to allow a user to add one or more of the relevant variable fields to the master comment in element 508—for example a field that displays a test result (e.g., the "[vis100 value]" field that displays the result of the viscosity test for the relevant sample). In general, variable fields (such as fields 512) are dynamic elements that acts as placeholders for specified data to be inserted by system 100 at some later stage, such as for example when a report is rendered. Each variable field may be coded to link to specific data, such as machine type, test result, test criteria, material identity, or other configured information in system 100. Note that master comment editor window 500 is exemplary, and system 100 may provide other and/or additional windows or screens corresponding to master comment editor functionality of system 100.

Window 500 is also configured to display one or more selectable elements 516 corresponding to one or more master key tags. In general, a master key tag is a tag or other variable information that may be appended to or otherwise configured to associate with a master key, and is configured such that it forms effectively (or actually) a new master key (for example, in a branched or child relationship with the parent or untagged master key), thereby allowing a user to create new master comments in system 100 that are more narrowly applied to samples. For example, in the embodiment shown in FIG. 5, window 500 present master key tag selectors as checkboxes 516*a* and dropdown lists and/or text fields 516*b*, wherein the dropdown lists and/or text fields allow a user to specify any category that is checked. In one non-limiting example, a user may select one or more checkboxes 516*a*, for example the checkboxes labelled "Mach", "Lubricant", "Fluid Type" and "Cust" (as illustrated in FIG. 5B) and fill in the corresponding text boxes and dropdowns with identifying information. In conjunction with selecting one or more key tags 516, a user may author a new comment and/or modify an existing comment in text field 508 to be keyed to or otherwise associated with the tagged/modified master key, and thereafter update system 100. In the example shown in FIG. 5B, new master comment 422*a* is inserted to the appropriate master comment table and keyed to the "new" (modified/tagged) master key. In this manner, the modified comment 422*a* effectively replaces master comment 422 in system 100 in relation to any sample having lab test results that produce derived master key 426 (a numeric string "491999 . . . "), and that also satisfy the key tags "Mach", "Lubricant", "Fluid Type", and "Cust"—i.e., and that are lab test results for material sampled from Pump A using XYZ brand oil, for the customer, GenCo. In other words, for any lab test results that cause a master key of "4919999 . . . " (master key 426), and that also satisfy the aforementioned key tag information, system 100 is configured such that it associates master comment 422*a*, in lieu of (or in priority to) master comment 422.

The embodiments disclosed herein should not be understood to be limited to any one particular way of implementing or architecting the master key tags, and in one exemplary embodiment the master key tags are generally implemented as additional primary key elements (e.g., in a multi-field primary key) for records in one or more relevant tables in system 100 (e.g., in master comment tables 154). In one or more exemplary embodiments using this implementation, system 100 is configured (and in particular, master expert component 140) such that it derives master keys from metrics generated for each of the test run results associated with a sample, as well as any key tag information (e.g., customer, report type, material type, source, etc.) associated with the sample. In this manner, by providing users the ability to tailor master comments and categorize them using key tags, such as by customer and source, system 100 provides an automated comment system that is flexible and is more finely tuned over time as more human analysis is embedded in a branched system of master comments/keys.

Figure 6:
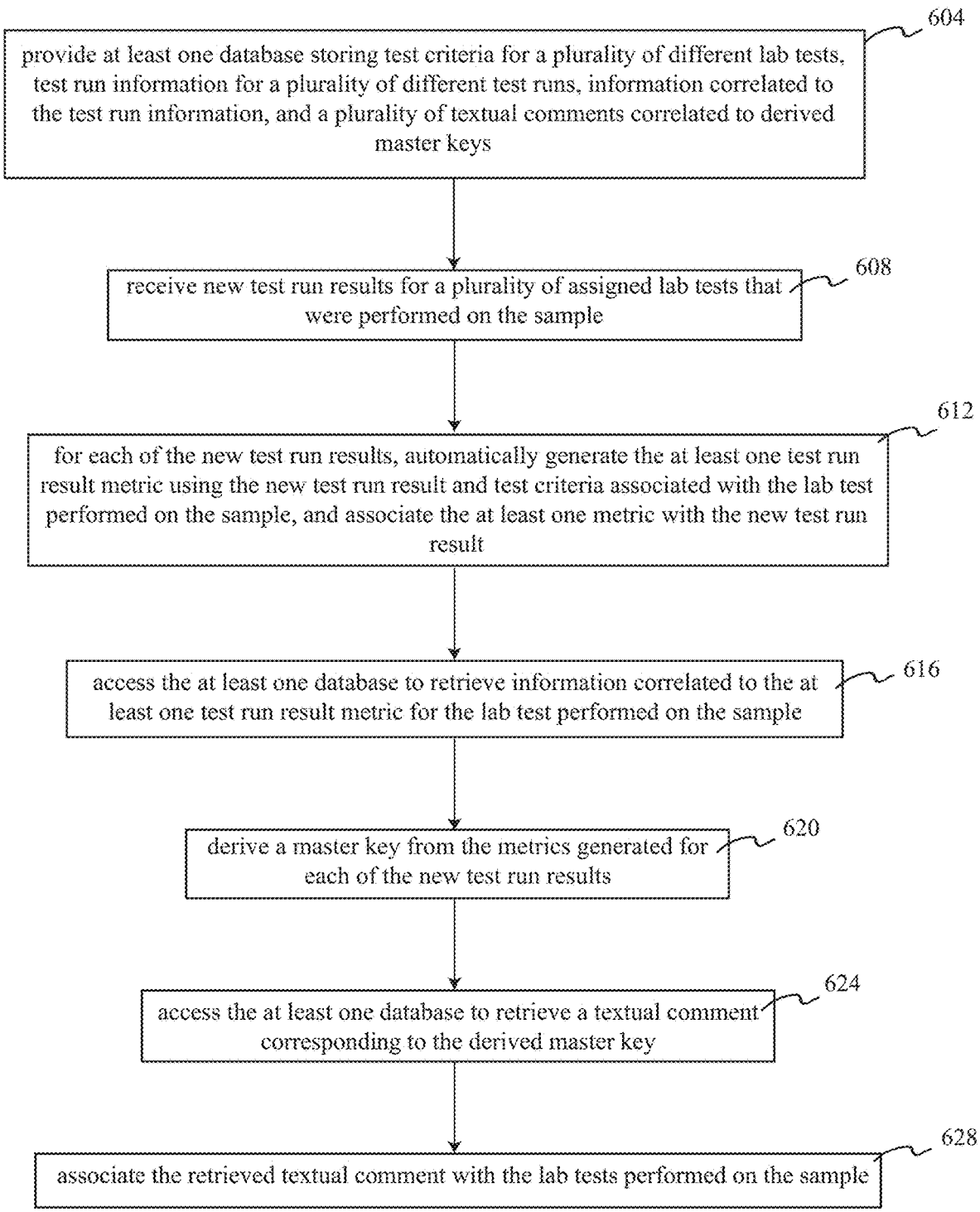
FIG. 6 is a flowchart illustrating one example of the operation of a system for evaluating a sample of material according to various embodiments described herein.

Turning now to FIG. 6, shown is a flowchart that provides one example of the operation of a system for evaluating a sample of material, such as system 100, according to various embodiments described herein. Note that the flowchart of FIG. 6 shows just an example of the different types of functional arrangements that may be employed to implement the operation of that system as described herein. Alternatively, the flowchart shown in FIG. 6 may be viewed as showing one example of steps of a computer-implemented method of evaluating a sample of material in system 100, under the control of one or more sub-systems configured with executable instructions.

Figure 7:
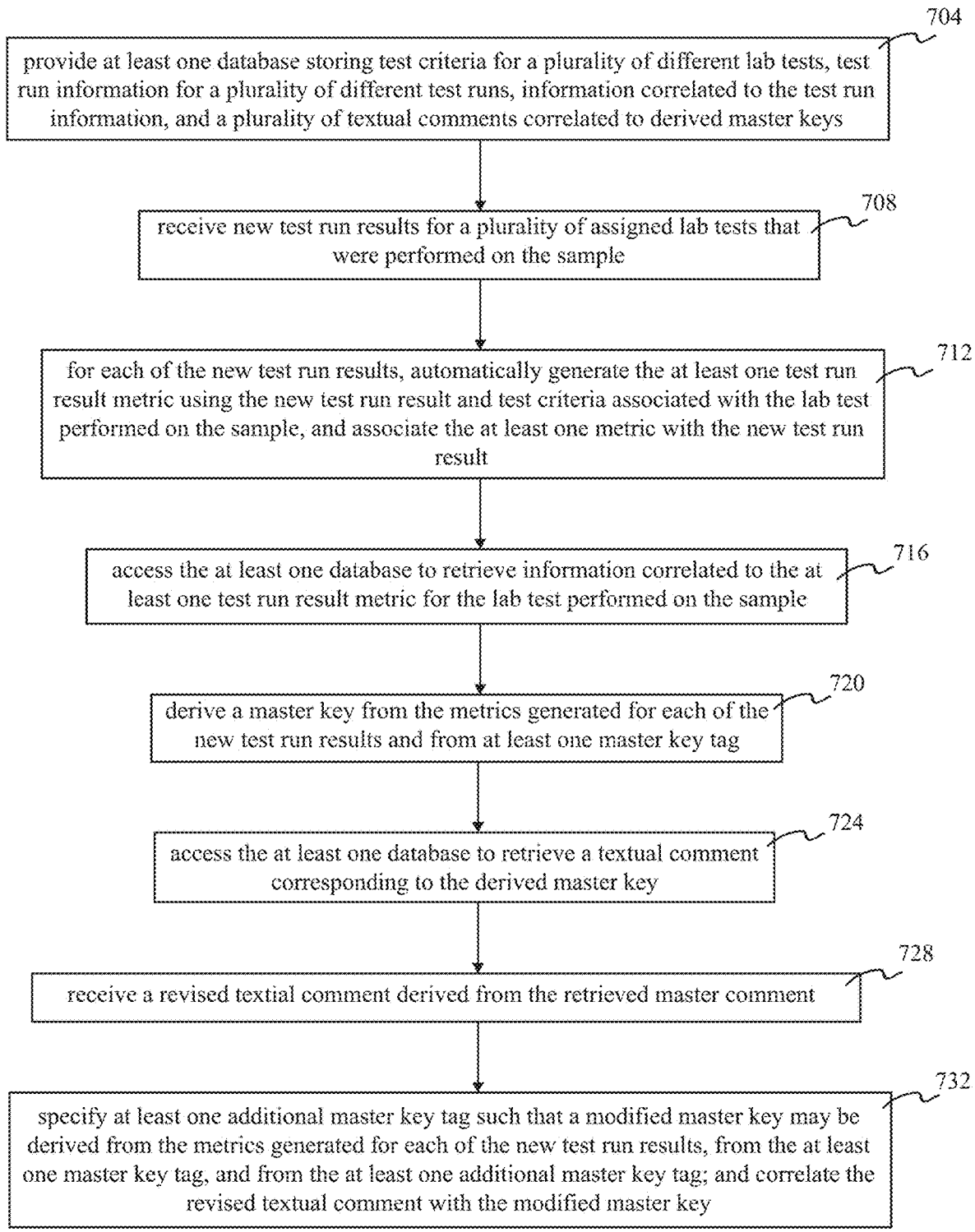
FIG. 7 is a flowchart illustrating one example of the operation of a system for evaluating a sample of material according to various embodiments described herein.

Although the functional operations shown in the figures herein, including FIGS. 6-7, are depicted in a particular order, the methods described herein are not necessarily limited to the particular order shown. A person of ordinary skill in the art may appreciate that all or a subset of the operations shown in the figures, including FIGS. 6-7, may be rearranged, changed, performed in different order (e.g., in parallel, in reverse order), combined, or omitted altogether without departing from the scope of the present disclosure or the spirit of the novel embodiments described herein. In addition, the functional steps depicted herein are intended to provide an understanding of the method to a person of ordinary skill in the art, rather than specifying an actual sequence of code execution, which may be implemented as different sequences or flows or modified in various ways to, e.g., optimize performance or functionality. In particular, any function calls or sequences of such calls described herein are intended to provide an understanding of the methods to a person of ordinary skill in the art, rather than specify actual call format or sequence, which may be implemented as different calls or sequence of calls or modified in various ways to, e.g., optimize performance or functionality.

Continuing with FIG. 6, at step 604 at least one database is provided, such as database 124, storing test criteria for a plurality of different lab tests, test run information for a plurality of different test runs, information correlated to the test run information, and a plurality of textual comments correlated to derived master keys, wherein test run information comprises at least one test run result metric. As described above, system 100 includes one or more configuration tables 138 that may store generally any pre-configured data and information suitable to support desired system functionality. In one or more embodiments, such pre-configured data and information includes data and information relating to a plurality of different lab tests. For example, in some embodiments such data includes criteria such as lab test alarm limit default values and/or test run results default rating scales. In one or more embodiments, such criteria is stored and/or associated with lab tests or samples based on the type of lab test (e.g., viscometer, rheometer, etc.), type of material sample (e.g., oil, grease, etc), and/or the source of the sample (e.g., sample from source "A", sample from source "B", etc).

With continuing reference to step 604, as previously described, system 100 includes one or more sample tables 142 that may store generally any data and information relating to a material sample suitable to support desired system functionality. For example, in one or more embodiments, sample table 142 stores source information for a sample (e.g., customer, location/plant, machine), sample collection dates, and sample status information. In general, sample status information may be any information indicative of a sample's current status. For example, in one or more embodiments, sample status includes at least one status indicator that indicates at least one of the test runs associated with the sample is in an error state.

With continuing reference to step 604, as previously described, system 100 includes one or more test run tables 146 that may store generally any data and information relating to test runs suitable to support desired system functionality. For example, in one or more exemplary embodiments, test run table 146 stores test run results information. In some embodiments, test run table 146 also stores at least one test run results metric for each test run performed on any material sample (even if it is simply a default value for certain samples and/or test types). In one or more exemplary embodiments, test run results metrics comprise test run results ratings information and test run results alarm condition information. In general, test run result ratings information may be any information indicative of quality or ranking of a test run result. For example, in some embodiments test run rating information comprises a numerical rating on a correlated scale (e.g., a whole number from 0-9). Generally, test run alarm condition information comprises any information sufficient to indicate an alarm limit or condition has been exceeded or otherwise satisfied. For example, in some embodiments test run alarm condition information comprises a numerical rating or alphanumeric value (e.g., a whole number or letter representing an error code). In one or more embodiments, system 100 stores test run data and information in multiple test run tables 146, wherein each table corresponds to a particular lab test (e.g., a demulsibility test run table, a viscosity test run table, etc.).

With continuing reference to step 604, as previously described, system 100 includes one or more sub-comment tables 150 that may store generally any data and information in the nature of a sub-comment and correlated to test run information. In general, sub-comments are any information in the nature of commentary, observations, summary, analysis, etc. that is directed to individual test run results. In general, sub-comments may be associated with individual lab test run results in any suitable manner that does not undermine the functionality of the embodiments herein. For example, in some embodiments each sub-comment is associated with a generated rating and/or alarm condition status for each test run result. In other embodiments, only a portion of the stored sub-comments are associated with one or more test run result metrics. In some embodiments, all or a portion of the stored sub-comments are associated with test run results, rather than results metrics.

With continuing reference to step 604, as previously described, system 100 includes one or more master comment tables 154 that store master comments correlated to derived master keys. As described above, a master comment is generally any information in the nature of commentary (including textual commentary), observations, summary, analysis, etc. that are directed to a set of test run results from a battery of tests performed on a material sample and/or to overall analysis or commentary on the material sample under test. Accordingly, whereas sub-comments are generally directed to individual test run results, master comments are generally more global in nature, with respect to the material sample in question. Also, as previously described, master keys are generally primary keys or other unique record identifiers that are derived from test run result metrics, and in one or more embodiments are derived from test run result ratings. In one preferred embodiment, the test run result ratings are whole numbers, and master keys are derived by concatenating the test run result ratings to form a numeric text string. In one or more embodiments, master keys serve as primary keys in master comment tables 154.

At step 608, new test run results are received for a plurality of assigned lab tests that were performed on the material sample. As previously described, lab tests herein generally may include any test capable of being performed on a sample using pre-defined test protocols and/or test conditions. Also as previously described, one or more lab tests are assigned, either as a default configuration or manually, at accessioning, although in some embodiments a user may manually assign additional or different tests to a sample at a later time. One non-limiting description of some suitable tests is provided and described above in relation to FIG. 1.

With continuing reference to step 608, results of lab test runs may generally be measured and received in any manner suitable for use in the systems and methods described herein, as previously described. For example, in some embodiments a technician prepares the material sample and test conditions, and initiates the desired test; thereafter, one or more local applications collect and/or package the test run results data into one or more test run files stored locally—e.g., on a local machine supporting the relevant measurement device, such as measurement device 128 of system 100 (FIG. 1). In other embodiments, a technician manually performs the test and records the test run results data into one or more test fun files stored locally. In either case, in these embodiments, one or more local applications periodically scan the local storage for new test run files and loads any such new files to central data store 130 (FIG. 1). Thereafter, in these exemplary embodiments, one or more applications 132 executing on computing environment 104 scans central data store 130 and parses the test run data in any newly discovered files and inserts/uploads the parsed data into one or more tables of database 124. Note that while FIG. 1 shows application 132 to be a component of base application 120, in one or more embodiments application 132 may comprise an application that is not integrated, or is more loosely coupled, with base application 120 (e.g., may comprise a standalone application). In one or more alternative embodiments, software driver(s) on local machines (not shown) that support the one or more measurement devices 128 allow for the one or more measurement devices to write data to related application 132 and/or to database 124.

At step 612, the system automatically generates the at least one test run result metric, for each of the new test run results, using the new test run result and test criteria associated with the lab test performed on the sample. As previously described, in one or more embodiments disclosed herein, after a new test run is performed on a sample and the new test run result is uploaded to the appropriate test run table 146, one or more evaluations of the uploaded result are automatically performed by system 100 (e.g., by triggering one or more stored procedures that execute in computing environment 104) to generate one or more test run result metrics. For example, in some embodiments the evaluations include one or more rating evaluations—generally any analysis that rates and/or ranks the test run result in question according to a pre-determined scale or methodology. Additionally, some embodiments may perform one or more alarm condition evaluations—generally any analysis comparing the test run result in question to one or more pre-configured limits. In one non-limiting example, the rating evaluation comprises comparing the test run result to one or more predetermined values and assigning a whole number rating between 0-9 to the result depending on how the test run result compares to the predetermined values. In another non-limiting example, the alarm condition evaluation compares the test run result to one or more pre-configured alarm limits (set by source and/or type standard) and assigns a whole number or alphanumeric value (e.g, a whole number between 0-9) depending on whether the test run result exceeds the one or more alarm limits (on either the high or low end) or not. In some embodiments, system 100 performs only an alarm condition evaluations (in which they may be considered to serve as a rating), while in others it performs both a rating evaluation and alarm condition evaluation. Note that the embodiments disclosed herein should not be understood to be limited by any specific rating or alarm condition evaluation scale or methodology, and generally any suitable scale or methodology may be employed that supports the objects of the embodiments herein.

With continuing reference to step 612, upon performing the one or more rating and/or alarm condition evaluations, system 100 associates the metric(s) with the relevant test run record. In some embodiments, this is accomplished by updating the test run record in table 146 with the rating (e.g., whole number) and/or alarm condition information (e.g. whole number or error code), although generally any suitable manner of associating the evaluation results may be employed. Note that in some embodiments of system 100, test run result data is automatically evaluated to determine a rating and/or alarm condition status for only a subset of test run types, while in others it is automatically evaluated for every test run type. In one or more exemplary embodiments, system 100 also supports manual rating and/or alarm condition evaluations.

At step 616, the database is accessed to retrieve information correlated to the at least one test run result metric for the lab test performed on the sample. In one or more embodiments, such information comprises one or more sub-comments stored in one or more sub-comment tables 150. In general, in the embodiments disclosed herein, sub-comments may be correlated with individual lab test run results and/or individual lab test run result metrics in any suitable manner that does not undermine the functionality of the embodiments herein. For example, in some embodiments, a mini-expert performs one or more sub-comment evaluations to determine the sub-comment(s) to associate with a particular lab test run result, if any, and retrieves the appropriate test result. In these embodiments, the sub-comment evaluation(s) may consider generally any suitable sub-comment criteria, such as for example: alarm limits, test run result metrics (e.g., alarm condition status, ratings), and/or pre-configured specification values with standard deviation values, etc. Suitable sub-comment criteria may be pre-configured and selected in any suitable manner that does not undermine the functionality of the embodiments disclosed herein. For example, in one or more embodiments the sub-comment criteria is applied based on sample type (e.g., oil, XYZ Brand oil, grease, filter particulates, etc), test type, and/or sample source (e.g., customer/plant/machine). In one or more embodiments, the sub-comment evaluations are part of/performed with the automatic test run result metric evaluations previously described (e.g., rating and/or alarm condition status evaluations).

At step 620, a master key is derived from the metrics generated for each of the new test run results. In general, in the embodiments disclosed herein, master keys may be derived from test run results metrics in any suitable manner that does not undermine the functionality of the system. For example, in one or more embodiments, master keys are derived by concatenating the metrics generated for the set of lab test results received for a sample. In preferred embodiments, the master expert derives the master keys. In some embodiments, the generated metrics are test result ratings comprising whole numbers (e.g., whole numbers 0-9), and the concatenated master key is a numeric string comprised of the ratings arranged in a pre-configured order to reflect/correlate with the lab tests in the battery of lab tests performed on the samples.

At step 624, the at least one database is accessed to retrieve a master comment corresponding to the derived master key. In one or more embodiments, the master comment comprises a textual comment. In one or more preferred embodiments, the master expert accesses the at least one database to retrieve the textual comment keyed to the derived master key.

In one or more exemplary embodiments, at step 628 the retrieved master comment (in some embodiments, the retrieved textual comment) is associated with the lab tests performed on the sample. In general, a retrieved master comment (e.g., textual comment) may be associated with the lab tests performed on the sample in any suitable manner. For example, in one or more embodiments metadata may associate the retrieved master comment (e.g., textual comment) with the lab tests performed. Also for example, in one or more embodiments, the retrieved master comment (e.g., textual comment) is stored in the at least one database in association with the results of the lab tests performed on the sample. In some embodiments, the retrieved master comment (e.g., textual comment) is stored with the relevant sample information in memory and/or in storage (e.g., in sample table 142). In one or more exemplary embodiments, the retrieved textual comment is displayed with an indication that the retrieved textual comment pertains to the results of the lab tests performed on the sample.

Additionally, or in the alternative, in one or more embodiments the retrieved textual comment is displayed—such as, for example, on a client device user interface—and the at least one database is again accessed (by, for example, one or more mini experts) and textual sub-comments correlated to each of the ratings generated for each of the new test run results are retrieved and displayed together with the retrieved textual comment.

Additionally, or in the alternative, in one or more embodiments a revised textual comment that has been derived from the retrieved textual comment is received by system 100 and associated with the lab tests performed on the sample. For example, in one or more embodiments, the retrieved textual comment is displayed on a client interface and a user modifies it, and (using the interface or otherwise) associates it with a sample and/or the lab tests performed on the sample by, for example, creating a new master key associated with the revised textual comment that applies to the sample and/or the lab tests performed on the sample. In one or more embodiments, the new master key is created by specifying one or more master key tags in relation to the master key associated with the retrieved textual comment. In other embodiments, the revised textual comment is associated with the lab tests performed on the sample by associating it with the master key that was used to retrieve the textual comment. For example, in one or more embodiments, the relevant record(s) in the master comment table(s) that is keyed by the master key is updated to include the revised textual comment. In one or more embodiments the revised textual comment replaces/overwrites the retrieved textual comment.

Additionally, or in the alternative, in one or more embodiments system 100 generates a report for the sample that identifies the source of the sample and includes the retrieved textual comment.

Turning now to FIG. 7, shown is a flowchart that provides one example of the operation of a system for evaluating a sample of material, such as system 100, according to various embodiments described herein. Note that the description relating to the operations outlined in connection with FIG. 6 applies to the operations outlined in connection with FIG. 7, unless context indicates otherwise. Note also that the flowchart of FIG. 7 shows just an example of the different types of functional arrangements that may be employed to implement the operation of that system as described herein. Alternatively, the flowchart shown in FIG. 7 may be viewed as showing one example of a computer-implemented method of evaluating a sample of material in system 100, under the control of one or more sub-systems configured with executable instructions.

Continuing with FIG. 7, at step 704 at least one database is provided, such as database 124, storing test criteria for a plurality of different lab tests, test run information for a plurality of different test runs, information correlated to the test run information, and a plurality of textual comments correlated to derived master keys, wherein test run information comprises at least one test run result metric. As described above, system 100 includes one or more configuration tables 138, sample tables 142, test run tables 146, sub-comment tables 150, and master comment tables 154 that may store generally any data and information suitable to support desired system functionality.

At step 708, new test run results are received for a plurality of assigned lab tests that were performed on the material sample, as previously described in relation to FIG. 6.

At step 712, the system automatically generates the at least one test run result metric, for each of the new test run results, using the new test run result and test criteria associated with the lab test performed on the sample, as previously described in relation to FIG. 6.

At step 716, the database is accessed to retrieve information correlated to the at least one test run result metric for the lab test performed on the sample, as previously described in relation to FIG. 6.

At step 720, a master key is derived from the metrics generated for each of the new test run results and from at least one master key tag. In general, in the embodiments disclosed herein, master keys may be derived from test run results metrics and one or more master key tags in any suitable manner that does not undermine the functionality of the system. In preferred embodiments, the master expert derives the master keys. For example, in one or more embodiments, master keys are derived by concatenating the metrics generated for the set of lab test results received for a sample, as well as any master key tag information associated with the set of lab test results. For example, in one or more preferred embodiments, a set of lab tests are associated by sample information in system 100 (e.g., by an associated common lab number for the sample), and the same sample may have one or more master key tag information (customer, report type, material type, source, etc.) associated therewith that the master expert evaluates and concatenates to the concatenated metrics. In other embodiments, system 100 evaluates the relevant sample information for key tag information and otherwise utilizes it to retrieve a correct master comment (i.e., otherwise utilizes key tag information to perform the function of a unique database record identifier). In some embodiments, the generated metrics are test result ratings comprising whole numbers (e.g., whole numbers 0-9), and the concatenated master key is a numeric string comprised of the ratings arranged in a pre-configured order to reflect/correlate with the lab tests in the battery of lab tests performed on the samples, followed by concatenated key tag information.

At step 724, the at least one database is accessed to retrieve a master comment corresponding to the derived master key. In one or more embodiments, the master comment comprises a textual comment. In one or more preferred embodiments, the master expert accesses the at least one database to retrieve the textual comment keyed to the derived master key.

In one or more exemplary embodiments, at step 728 a revised master comment (e.g., revised textual comment) that has been derived from the retrieved master comment (e.g., retrieved textual comment) is received by system 100. For example, in one or more embodiments, the retrieved textual comment is displayed on a master expert interface and a user modifies it.

In one or more exemplary embodiments, at step 732 at least one additional master key tag is specified and a modified master key is generated that is derived from the metrics generated for each of the new test run results, from the at least one master key tag, and from the at least one additional master key tag, and the revised master comment (e.g., the revised textual comment) is correlated with the modified master key. For example, in one or more embodiments, a master expert interface is utilized to select at least one additional master key tag in relation to the revised master comment, and to update system 100. In these embodiments, the interface is configured to update system 100 to incorporate the newly specified master key tag by, for example, inserting one or more records in master comment table 154 to incorporate the revised textual comment and key it to the modified master key.

Additionally, or in the alternative, in one or more embodiments the retrieved master comment (e.g., the retrieved textual comment) is associated with the lab tests performed on the sample. In general, a retrieved master comment may be associated with the lab tests performed on the sample in any suitable manner. For example, in one or more embodiments metadata may associate the retrieved master comment with the lab tests performed. Also for example, in one or more embodiments, the retrieved master comment is stored in the at least one database in association with the results of the lab tests performed on the sample. In some embodiments, the retrieved master comment is stored with the relevant sample information in memory and/or in storage (e.g., in sample table 142). In one or more exemplary embodiments, the retrieved textual comment is displayed with an indication that the retrieved textual comment pertains to the results of the lab tests performed on the sample.

Additionally, or in the alternative, the at least one database is accessed to retrieve the revised master comment (e.g., textual comment) using the modified master key, and the retrieved revised textual comment is associated with the lab tests performed on the sample.

Additionally, or in the alternative, in one or more embodiments the retrieved textual comment is displayed—such as, for example, on a client device user interface—and the at least one database is again accessed (by, for example, one or more mini experts) and textual sub-comments correlated to each of the ratings generated for each of the new test run results are retrieved and displayed together with the retrieved textual comment.

Additionally, or in the alternative, in one or more embodiments system 100 generates a report for the sample that identifies the source of the sample and includes the retrieved textual comment.

Figure 8:
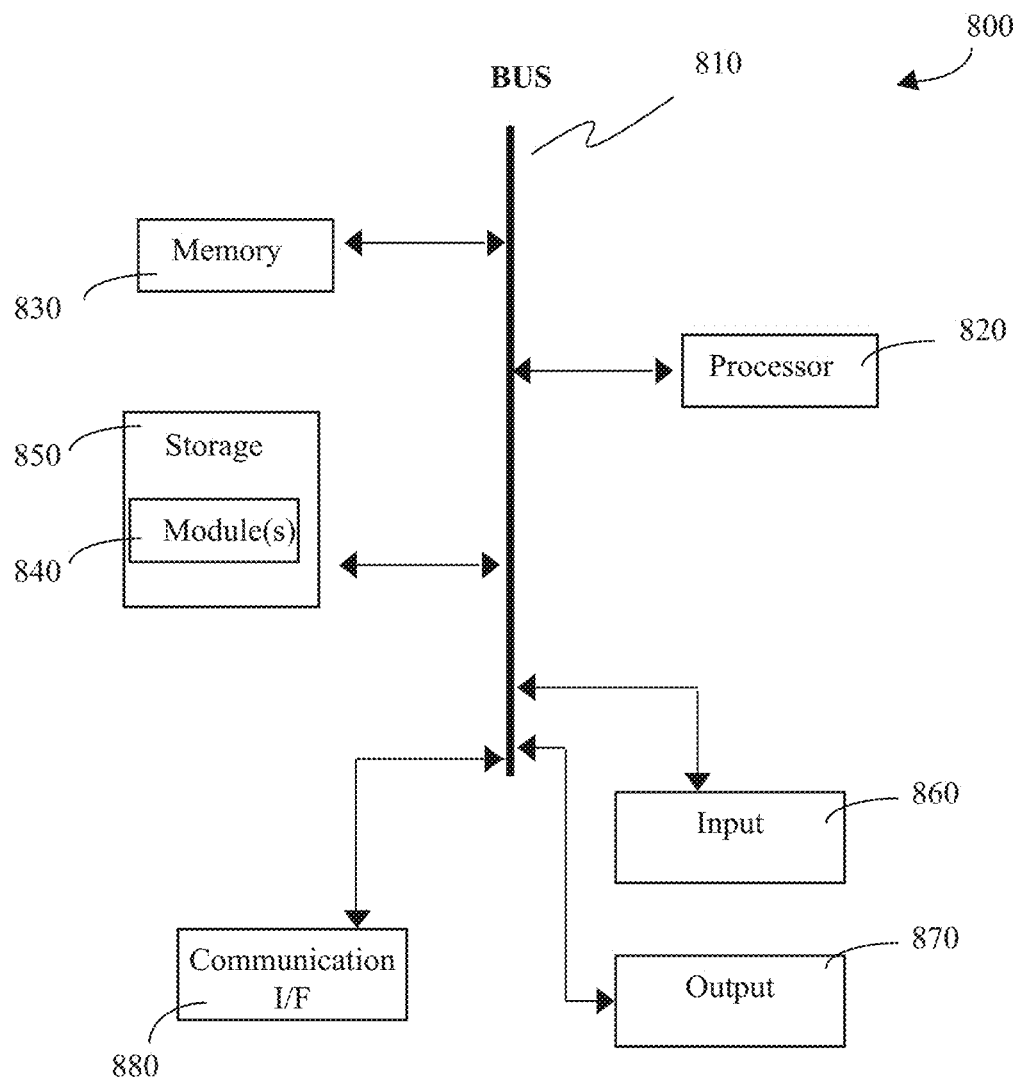
FIG. 8 is a block diagram illustrating an exemplary computing system in which various embodiments of the present disclosure may be implemented.

Turning to FIG. 8, illustrated is a logical arrangement of a set of general components of a basic general purpose system or computing device 800 (for example, a general purpose computer) which may be employed to practice the embodiments of the present disclosure. System bus 810 ties system components including system memory 830 (e.g., ROM and/or RAM) to processor 820. System bus 810 may generally be any suitable type of bus structure using any suitable bus architecture, such as for example, a memory bus or controller, a peripheral bus, or a local bus. Information transfer to/from the bus (and components) may be accomplished by any suitable means, such as for example a BIOS stored in ROM 830 or the like. System memory 830 may include other and different types of memory than ROM/RAM. Computing device 800 may have more than one processor 820 or may comprise a group or cluster of computing devices 800 networked together to provide greater processing capacity. Processor 820 may include any general purpose processor, with our without one or more hardware or software modules 840 stored in storage device 850, configured to control processor 820, as well as any special-purpose processor. Computing device 800 may include storage 850 (e.g., flash disk drive, hard disk drive, magnetic or optical disk drive, or the like). Storage device 850 may include one or more software modules 840 for controlling processor 820. In general, the drives and the associated non-transitory computer readable storage media provide nonvolatile storage of computer readable instructions, data structures, program modules and data for computing device 800. A person of ordinary skill in the art would know how to make variations to the basic components described to suit a particular function or need. Non-transitory computer-readable storage media expressly exclude media such as energy, carrier signals, electromagnetic waves, and signals per se.

With continuing reference to FIG. 8, computing device 800 may comprise input device 860 and output device 870. In general, input device 860 may be any number of input means, such as a microphone for speech, a touch-sensitive screen for gesture or graphical input, a keyboard, mouse, and the like. Also in general, output device 870 may any number of output means, such as for example a visual monitor (LCD, CRT, etc.), a printer, and the like. Communications interface 880 generally governs and manages the user input and system output. A person of ordinary skill in the art would know that the basic features described here may easily be substituted for improved hardware or firmware arrangements as they are developed.

The exemplary system of FIG. 8 is illustrated as including individual functional blocks. In general, the functions represented by these blocks may be provided through the use of either shared or dedicated hardware, including but not limited to, hardware capable of executing software and hardware that is purpose-built to operate as an equivalent to software executing on a general purpose processor. Some embodiments may include general processor, microprocessor and/or digital signal processor (DSP) hardware, read-only memory (ROM) (e.g., memory 830) for storing software performing the operations described herein, and random access memory (RAM) for storing results. Logical operations of various embodiments described herein may be implemented as, for example, a sequence of computer implemented steps, operations, or procedures running on a processor or processing resource within one or more general or specific-use computers. System 800 may practice all or part of the recited methods, may be a part of the recited systems, and/or may operate according to instructions in the recited non-transitory computer-readable storage media. Such logical operations may be implemented as modules configured to control processor 820 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media may be any available media that can be accessed by a general purpose or special purpose computer. Non-limiting examples may include: RAM, ROM, EEPROM, flash memory or other memory, CD-ROM, DVD or other optical disk storage, magnetic disk storage or other magnetic storage devices, or any other medium which can be used to carry or store desired information (e.g., program code means in the form of computer-executable instructions, data structures, or processor chip design). When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions may include, for example, instructions and data which cause a general purpose computer, special purpose computer, or special purpose processing device to perform a function or group of functions. Computer-executable instructions may also include program modules that are executed by computers in standalone or network environments. In general, program modules may include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. A particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure. We therefore claim as our invention all that comes within the scope of these claims.

We claim:

1. A computer-implemented method of evaluating a sample of material, the method comprising:
providing at least one database storing test criteria for a plurality of different lab tests, test run information for a plurality of different test runs, and a plurality of textual comments correlated to derived master keys, wherein test run information comprises for each lab test, a test run result metric and information correlated to the test run result metric;
receiving new test run results for a plurality of assigned lab tests that were performed on the material sample;
for each of the new test run results, automatically generating a test run result metric using the new test run result and test criteria associated with the lab test performed on the sample, and associating the test run result metric with the new test run result;
accessing the at least one database to retrieve information correlated to the test run result metrics for the lab tests performed on the sample;
deriving a master key from the test run result metrics generated for the new test run results;
accessing the at least one database to retrieve a textual comment corresponding to the derived master key; and
displaying the retrieved textual comment.

2. The computer-implemented method of claim 1, further comprising: associating the retrieved textual comment with the lab tests performed on the sample.

3. The computer-implemented method of claim 2, wherein the associating step comprises displaying the retrieved textual comment with an indication that the retrieved textual comment pertains to the results of the lab tests performed on the sample.

4. The computer-implemented method of claim 1, wherein the test run result metrics comprise ratings of the test run results, and wherein the deriving step comprises concatenating the ratings generated for the new test run results.

5. The computer-implemented method of claim 4, wherein the ratings generated are each a whole number.

6. The computer-implemented method of claim 1, wherein the test run result metrics comprise ratings of the test run results and wherein the information stored in the at least one database that is correlated to the test run metrics comprises textual sub-comments.

7. The computer-implemented method of claim 6, further comprising: accessing the at least one database to retrieve textual sub-comments correlated to each of the ratings generated for each of the new test run results; and displaying the retrieved sub-comments together with the textual comment.

8. The computer-implemented method of claim 1, further comprising: receiving a revised textual comment that has been derived from the retrieved textual comment; and associating the revised textual comment with the lab tests performed on the sample.

9. The computer-implemented method of claim 8, further comprising: in the at least one database, replacing the retrieved textual comment with the revised textual comment such that only the revised textual comment is associated with the derived master key.

10. The computer-implemented method of claim 1, further comprising: generating a report for the sample that identifies the source of the sample and includes the retrieved textual comment.

11. A computer-implemented method of evaluating a sample of material, the method comprising:
   providing at least one database storing test criteria for a plurality of different lab tests, test run information for a plurality of different test runs, and a plurality of textual comments correlated to derived master keys, wherein test run information comprises for each lab test, a test run result metric and information correlated to the test run result metric;
   receiving new test run results for a plurality of assigned lab tests that were performed on the material sample;
   for each of the new test run results, automatically generating a test run result metric using the new test run result and test criteria associated with the lab test performed on the sample, and associating the test run result metric with the new test run result;
   accessing the at least one database to retrieve information correlated to the test run result metrics for the lab tests performed on the sample;
   deriving a master key from the test run result metrics generated for the new test run results and from at least one master key tag;
   accessing the at least one database to retrieve a textual comment corresponding to the derived master key; and
   displaying the retrieved textual comment.

12. The computer-implemented method of claim 11, further comprising: associating the retrieved textual comment with the lab tests performed on the sample.

13. The computer-implemented method of claim 12, wherein the associating step comprises displaying the retrieved textual comment with an indication that the retrieved textual comment pertains to the results of the lab tests performed on the sample.

14. The computer-implemented method of claim 11, wherein the test run result metrics comprise ratings of the test run results, and wherein the deriving step comprises concatenating the ratings generated for the new test run results.

15. The computer-implemented method of claim 14, wherein the ratings generated are each a whole number.

16. The computer-implemented method of claim 11, wherein the test run result metrics comprise ratings of the test run results and wherein the information stored in the at least one database that is correlated to the test run metrics comprises textual sub-comments.

17. The computer-implemented method of claim 11, further comprising: receiving a revised textual comment that has been derived from the retrieved textual comment; specifying at least one additional master key tag such that a modified master key may be derived from the metrics generated for the new test run results, from the at least one master key tag, and from the at least one additional master key tag; and correlating the revised textual comment with the modified master key.

18. The computer-implemented method of claim 17, further comprising: storing the revised textual comment in the at least one database such that it is keyed to the modified master key; accessing the at least one database to retrieve the revised textual comment using the modified master key; and associating the retrieved revised textual comment with the lab tests performed on the sample.

19. The computer-implemented method of claim 11, further comprising: generating a report for the sample that identifies the source of the sample and includes the retrieved textual comment.

* * * * *